Oct. 7, 1941.　　　　L. S. WILLIAMS　　　　2,258,308
COIN-CONTROLLED WIEGHING SCALE
Filed March 31, 1937　　　　2 Sheets-Sheet 1
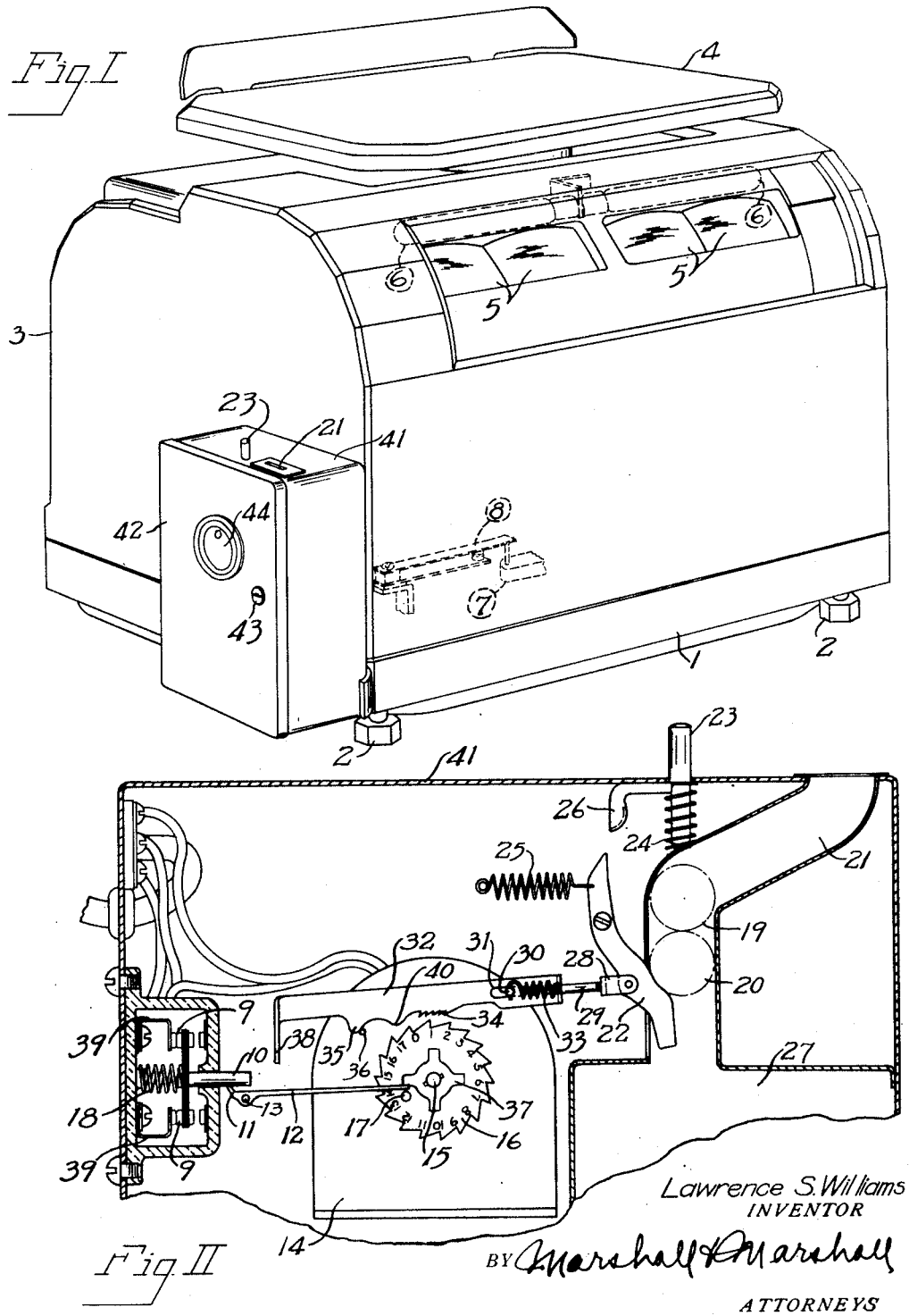
Fig. I
Fig. II
Lawrence S. Williams
INVENTOR
BY Marshall & Marshall
ATTORNEYS

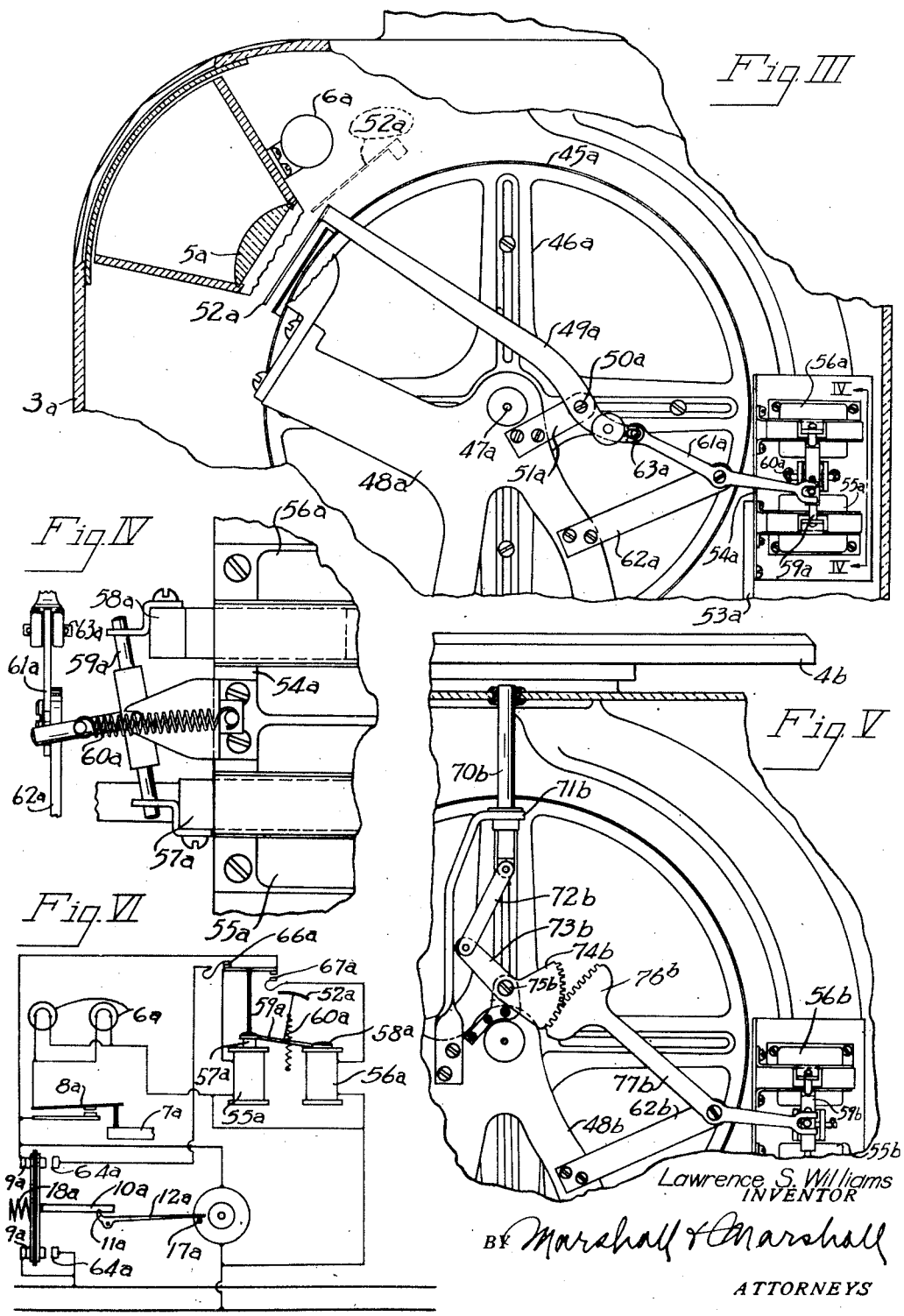

Patented Oct. 7, 1941

2,258,308

UNITED STATES PATENT OFFICE 2,258,308

COIN-CONTROLLED WEIGHING SCALE

Lawrence S. Williams, Toledo, Ohio, assignor to Toledo Scale Company, a corporation of New Jersey Application March 31, 1937, Serial No. 133,967

2 Claims. (Cl. 194—1)

This invention relates to coin-controlled weighing scales and has for its principal object to provide a weighing scale which, by deposits of coins, may be made available for use for definite periods of time.

Another object is the provision of a weighing scale having an indicator which, upon deposits of coins, can be rendered visible for definite periods of time.

Another object is the provision of a scale having means for locking its weighing mechanism against use, and means for rendering the locking means inoperative for definite periods of time after deposits of coins.

Other objects and advantages will be apparent from the following description, in which reference is made to the accompanying drawings illustrating preferred embodiments of my invention and wherein like reference numerals designate similar parts throughout the several views.

In the drawings:

Figure I is a view in perspective of a coin-controlled weighing scale embodying my invention, a switch and illuminating elements being shown in broken lines;

Figure II is an enlarged fragmentary sectional view showing a part of a coin-operated timing device which is incorporated in the scale illustrated in Figure I;

Figure III is an enlarged fragmentary elevational view, parts being in section, showing a modification of my invention in which the scale indication may be rendered visible by operation of a coin-controlled shutter;

Figure IV is a further enlarged fragmentary elevational view taken from the position indicated by the line IV—IV of Figure III;

Figure V is an enlarged fragmentary elevational view, with parts in section, showing another modification of my invention having a coin-controlled locking device; and Figure VI is a wiring diagram showing circuits employed in the forms of my invention illustrated in Figures III, IV and V.

Referring to the drawings in detail, the weighing and indicating mechanisms of the scale are supported on a base 1 provided with leveling feet 2, and are contained within a housing 3, above which lies a load-receiving platter 4.

The load-counterbalance may be of any desired type, such, for examples, as a pendulum type like that shown in United States Patent No. 2,066,624 to Halvor W. Hem, or a spring type such as is shown in United States Patent No. 2,063,712 to Edward J. Von Pein. Since such load-counterbalancing mechanisms are well known, and since my invention does not reside in the weighing mechanism per se, I have not illustrated any particular type of load-counterbalance.

In the form of scale shown in Figure I, the indicated values are behind lenses 5 and are difficult to see when they are not illuminated. Illumination is provided by lamps 6 located in the upper part of the housing 3, the lighting circuit being closed by movement of a lever 7 away from zero position when a load is placed upon the platter 4. When the lever 7 is in zero position it holds the switch 8 open, and as the lever moves from zero position it allows the switch to close.

A pair of contacts 9 also is interposed in the lighting circuit, these contacts being held closed by means of a rod 10 having a notch in its lower side which is engaged by a pawl 11 formed on the end of a pawl lever 12 which is fulcrumed on a pin 13. The interval of time during which the scale remains operative is measured by a clock 14, preferably electrically operated, which has a slowly revolving spindle 15, the spindle in the form of device illustrated in Figure II being geared to rotate once in eighteen days. The clock 14 is located with the spindle 15 adjacent the end of the pawl lever 12, and mounted on the spindle is a ratchet wheel 16 from which projects a lug 17, the path and direction of movement of the lug being such that upon continued rotation of the spindle 15 the lug will lift the end of the pawl lever 12 and disengage the pawl 11 from the notch in the rod 10, whereupon the contacts 9 will be opened by the expansive force of a spring 18. Opening the contacts 9 darkens the scale indication by stopping the flow of current through the lamps 6 and thus renders the scale practically unusable.

The scale can be rendered usable again by inserting coins, such as 19 and 20, in a chute 21. When a coin 20 is inserted in the chute 21 it slides down the chute until obstructed by a cam surface formed on a pivoted member 22. Located above the position assumed by the coin 20, when it is held in the chute by the pivoted member 22, is a plunger 23 which is normally held in its uppermost position by a spring 24. The conformation of the chute and the length of the plunger may be such that when the plunger is pushed downwardly it will strike the coin 20 which lies against the cam surface of the pivoted member 22, but in the form of device illustrated in Figure II the shape of the chute and the length of the plunger are such that an additional coin 19 must be interposed between the plunger 23 and the coin that lies against the cam surface of the pivoted member 22 to communicate movement of the plunger to the pivoted member.

When the plunger 23 is pushed downwardly it acts through the two coins to swing the pivoted member 22 against the tension of a retractile spring 25, and as the pivoted member swings, its upper end is caught by a hook 26 that is fixed to the plunger 23, the shapes of the upper end of the pivoted member and the hook being such that continued downward movement of the plunger adds to the swinging movement of the pivoted member sufficiently to move its lower end out of the chute 21 and permit both coins to fall into a coin receptacle 27. By changing the shape of the coin chute and the length of the plunger, the device may be adapted to be operated by one coin, such as a 25¢ piece, or by two or more coins.

Connected to the pivoted member 22, by means of a yoke 28, is a push rod 29 having its end bent laterally to form a lug 30 which extends through an elongated opening in a bar 32, the lug being normally held in the end of the opening 31 by means of a retractile spring 33, one end of which is attached to the lug 30, the other end of the retractile spring being attached to a laterally bent ear on the end of the bar 32. The lower side of the bar 32 is serrated at 34 and is provided with a protuberance 35 which, when the parts are in the position in which they are shown in Figure II, rests upon a pin 36 projecting from the frame of the clock 14, and thus holds the serrations 34 away from the ratchet wheel 16.

When coins 19 and 20 have been deposited in the chute 21 and the plunger 23 is pushed downwardly and acts through the coins 19 and 20 to swing the pivoted member 22 about its pivot, the bar 32 is moved endwise and the protuberance 35 slides off of the pin 36 and permits the serrated portion of the bar 32 to engage one of the teeth of the ratchet wheel 16. The portion of the bar 32 which slides over the pin 36 is so shaped that the serrated portion 34 of the bar remains in engagement with a tooth of the ratchet wheel 16 through a sufficient part of the movement of the bar 32 to rotate the ratchet wheel 16 counterclockwise through an angle equal to the angular spacing between the teeth, so that the next adjacent tooth of the ratchet wheel is moved into the position formerly occupied by the tooth engaged by the serrated portion of the bar 32.

The ratchet wheel 16 is not fixed to the spindle 15 but is frictionally held against an abutment on the spindle 15 by a spring washer 37 which is stiff enough to cause the ratchet wheel to turn with the spindle 15 when the ratchet teeth are not engaged by the serrated portion of the bar 32 but is not stiff enough to cause the spindle 15 to rotate with the ratchet wheel when the ratchet wheel is moved by the bar 32. If coins are deposited in the coin chute 21 and the plunger 23 pressed at a time when the lug 17 has not lifted the end of the pawl lever 12, the only function of the bar 32 is to turn the ratchet wheel 16 through the angular spacing of one tooth.

A depending finger 38 formed on the end of the bar 32 engages the rod 10 near the end of the stroke of the bar 32. If the lug 17 has raised the end of the pawl lever 12, thus withdrawing the pawl 11 from the notch in the lower side of the rod 10, the contacts 9 will have been opened by the expansive force of the spring 18 and the rod 10 will have been pushed to the right. Opening of the contacts 9 not only breaks the circuit to the lamps 6, but it also breaks the circuit to the electric clock 14, so that the clock does not turn while the scale is not usable. When the mechanism is in this condition, movement of the bar 32 will first turn the ratchet wheel 16 counterclockwise and move the lug 17 away from the end of the pawl lever 12, so that the pawl 11 will press against the lower side of the rod 10. The continued movement of the bar 32 will carry the finger 38 against the end of the rod 10, and further movement of the bar 32 will cause the finger 38 to push the rod 10 to the left until the contacts 9 again close and the pawl 11 engages the notch on the lower side of the rod 10. When the contacts 9 are closed, the U-shaped brackets 39, by which the contacts are connected to the circuit wires, will flex sufficiently to permit some further movement of the bar 32. In the final movement of the bar 32 which completes the counterclockwise turning of the ratchet wheel 16, the finger 38 is lifted out of engagement with the ratchet wheel and out of engagement with the end of the rod 10, this final lifting movement being caused by a bulge 40, on the lower side of the bar 32, riding upon the pin 36. Thus, even though the plunger 23 be latched down or held down by a weight for the purpose of keeping the scale operative without further deposit of coins, the ratchet wheel will turn and the contacts 9 will snap open when the lug 17 again lifts the end of the pawl lever 12.

The user of the scale may make a coin deposit at the beginning of each period of use, for example each morning, or he may make advance deposits. In the condition in which the mechanism is shown in Figure II, the scale will be kept operative for one period. If while the mechanism is in this condition a pair of coins such as 19 and 20 are deposited in the chute and the plunger 23 is pressed downwardly, the ratchet wheel 16 will be moved on the spindle 15 through the angular spacing of an additional tooth and the mechanism will thus be placed in condition to keep the scale operative for two periods. If another pair of coins be deposited and the plunger again pressed, the scale will remain operative for three periods, and if still another pair of coins be deposited and the plunger pressed, it will remain operative for four periods. The user of the scale thus may prepay for its use for as many as seventeen periods in advance.

The spring 33 is stiff enough to hold the lug 30 in the end of the opening 31, in which it is shown in Figure II, during all ordinary manipulation of the coin-controlled mechanism, but if the user of the scale should prepay for seventeen periods in advance and then force additional coins into the chute, the lug 17 would come against the top of the pawl lever 12 and the ratchet wheel 16 would be prevented from turning further in a counterclockwise direction. Hence, when the serrations on the lower side of the bar 32 come into engagement with the teeth of the ratchet wheel, the bar would be held against movement. In such case the spring 33 would stretch and permit coins to be forced through the chute without spoiling the mechanism.

The coin-operated mechanism may be located inside the housing 3, but since the connection between the coin-operated mechanism and the scale, in the form of device shown in Figure I and described above, is electrical, I have located the coin-operated mechanism in an auxiliary casing 41 which is shown as mounted on the base 1. The auxiliary casing 41 may, if desired, be located remotely from the remainder of the scale. It may, for example, be concealed under the counter upon which the remainder of the scale stands. In any case, it is provided with a cover or door 42 which has a lock 43, the key to which remains in the possession of the person authorized to collect coins from the receptacle 27. If the coin-controlled scale be leased the key will remain in possession of a representative of the lessor, and if the coin-controlled scale shall have been sold with provision for installment payments, the key will remain in possession of a representative of the vendor.

The clock 14 may be provided with an indicator 44 which can be seen from the exterior of the auxiliary casing 41 so that the user of the scale may learn by inspection of the indicator 44 how long the scale will remain usable without further coin deposits.

In the form of device illustrated in Figures III and IV, visibility of the indicator of the scale is controlled not only by turning on and off the lights, but by raising and dropping a shutter.

The scale illustrated in Figure III is like that illustrated in Figure I in having the mechanism enclosed in a housing 3a, the indicating values being behind the lenses 5a and being illuminated by lamps 6a. The indicating characters consist of computed value figures printed on a cylindrical chart 45a mounted on spiders 46a fixed upon a rotatable spindle 47a which is supported by a bracket 48a. The bracket 48a also supports a lever 49a which is pivoted at 50a to an arm 51a extending from the bracket 48a. The lever 49a carries a shutter 52a which, as the lever 49a swings about its pivot, is moved from the full line position in which it is shown in Figure III to the dotted line positions in which it is shown in Figure III. When the shutter 52a is in the full line position in which it is shown in Figure III, the chart is eclipsed and cannot be seen through the lenses 5a.

Erected from the base of the scale is a post 53a which supports a frame 54a upon which are mounted two solenoids 55a and 56a. The solenoid cores 57a and 58a are connected respectively to opposite ends of the crossbar portion of a T-shaped lever 59a which is pivoted at the intersection of its stem and crossbar portions to the frame 54a and also is connected to the frame by means of overcenter springs 60a. The stem portion of the T-shaped lever 59a engages a notch in a motion-transmitting lever 61a pivoted to an arm 62a which projects from the bracket 48a. The motion-transmitting lever 61a is pivoted to the shutter-carrying lever 49a by means of a pin-and-slot connection 63a which permits movement of the levers 61a and 49a about their fulcrums without placing the parts under strain.

In Figure VI are diagrammed the circuits controlling the mechanism illustrated in Figures III and IV. While the mechanism is illustrated in Figures III and IV in the condition in which the shutter is closed, the circuits are diagrammed in Figure VI in the condition in which the shutter is open. When a load is placed on the scale the lever 7a moves downwardly, permitting the switch 8a to close and the lamps 6a to light. With the passage of time, the lug 17a lifts the pawl lever 12a and disengages the pawl 11a from the notch in the lower side of the rod 10a, thus permitting the spring 18a to open the contacts 9a and break the circuit to the lamps 6a. Action of the spring 18a closes the auxiliary contacts 64a and completes a circuit through the solenoid 55a, whereupon the solenoid core 57a is drawn into the solenoid 55a and the T-shaped lever 59a is swung into the position in which it is shown in Figures III and IV, thus closing the shutter 52a. As the solenoid core 57a moves into the solenoid 55a it opens contacts 66a and breaks the circuit to the solenoid 55a. The T-shaped lever, however, is held in the position in which it is shown in Figures III and IV by action of the overcenter springs 60a.

When the contacts 66a are open, contacts 67a are closed. Hence, the circuit to the solenoid 56a is prepared for closing by the contacts 9a by means of the coin-controlled mechanism. The coin-controlled mechanism which closes the contacts 9a is identical with that illustrated in Figure II. When the coin-controlled mechanism is operated, the lug 17a is moved away from the pawl lever 12a and the pawl 11a engages the notch in the lower side of the plunger 10a, which has been moved to close the contacts 9a. When the contacts 9a are closed, the circuit through the solenoid 56a is completed, the solenoid core 58a is drawn into the solenoid and the T-shaped lever 59a is again tipped to the position in which it is shown in Figure VI, thereby moving the shutter 52a away from its eclipsing position. The overcenter springs 60a hold the solenoid operated parts in open shutter position until the contacts 64a are again closed. Failure of current in the supply line will not cause the shutter to close.

In the modified form of device shown in Figure V the circuits employed are identical with those diagrammed in Figure VI. Instead of a shutter which is opened when the scale is to be made usable and closed when it is to be made unusable, the solenoids 55b and 56b and T-shaped lever 59b operate means to lock the weighing mechanism against movement. The locking means includes a vertically movable plunger 70b which is slidably mounted in a support 71b and is connected at its lower end to a link 72b which, in turn, is pivoted to an arm 73b which is integral with a sector 74b, the arm and sector unit being pivoted at 75b to an ear secured to the bracket 48b. Meshing with the teeth of the sector 74b are teeth of a sector 76b which is integral with a lever 77b which is pivotally mounted on an arm 62b and which has a notched end engaged by the stem portion of the T-shaped lever 59b. When the electrical apparatus is in the condition in which it is shown in Figure VI, the vertically movable plunger 70b is held in the position in which it is shown in Figure V, the weighing mechanism thus being unlocked. When, however, the solenoid 56b is energized at the end of the period for which the timing mechanism has been set, the T-shaped lever 59b acts through the lever 77b, the sectors 76b and 74b and the link 72b to move the plunger 70b upwardly into engagement with the under side of the platter 4b, thus locking the weighing mechanism of the scale against use.

The embodiments of my invention herein shown and described are to be regarded as illustrative only, and it is to be understood that the invention is susceptible to variation, modification and change within the spirit and scope of the subjoined claims.

Having described my invention, I claim:

1. In a device of the class described, in combination, weighing means, means for measuring time periods each exceeding one hour's duration, means having a part engageable with a part of said weighing means to lock said weighing means against use, means controlled by said time period measuring means to move said parts after such time periods into locking engagement, coin-controlled means for resetting said time period measuring means, and means operated by said coin-controlled resetting means to move said parts out of engagement, whereby said weighing means is rendered usable for protracted series of weighments.

2. In a device of the class described, in combination, self-indicating weighing means, means for measuring a protracted time period, obstructing means having a part movable into interfering relation with said self-indicating weighing means to prevent use of said self-indicating weighing means only at the end of said time period, means controlled by said time period measuring means to move said part after said time period into such interfering relation with said self-indicating weighing means, coin-controlled means for resetting said time period measuring means, and means operated upon operation of said coin-controlled resetting means to move said part out of such interfering relation, whereby said self-indicating weighing means is rendered useful for a series of weighments during said time period without resetting of said coin-controlled means.

LAWRENCE S. WILLIAMS.